United States Patent [19]
Bell

[11] Patent Number: 5,104,219
[45] Date of Patent: Apr. 14, 1992

[54] MULTIMODE ACOUSTO-OPTIC SWITCH AND DEAD ZONE CORRECTION METHOD

[75] Inventor: Florian G. Bell, Bend, Oreg.

[73] Assignee: Tektronix, Inc., Beaverton, Oreg.

[21] Appl. No.: 684,107

[22] Filed: Apr. 12, 1991

Related U.S. Application Data

[62] Division of Ser. No. 463,703, Jan. 11, 1990, Pat. No. 5,046,832.

[51] Int. Cl.$^5$ .................. G01N 21/84; G01N 21/88
[52] U.S. Cl. .................................................. 356/73.1
[58] Field of Search ........................................ 356/73.1

[56] References Cited

U.S. PATENT DOCUMENTS 4,983,037  1/1991  Messing et al. ............... 356/73.1

Primary Examiner—Vincent P. McGraw
Attorney, Agent, or Firm—William K. Bucher

[57] ABSTRACT

An acousto-optic modulator for use in an optical time domain reflectometer to test multimode optical fibers has an active material, such as AS-Se-Ge or $As_2S_3$ glass, that has a high figure of merit with a low insertion loss. The transducer for the modulator is configured to have a height that encompasses the multimode beam diameter at the optical wavelength, and a length that is consistent with a theoretical lower limit that is a function of the acoustic and optical wavelengths. Sufficient RF power is applied to the modulator to produce an angular efficiency, or optical throughput, that is sufficient to meet the specifications for the optical time domain reflectometer. Further dead zone correction for the optical time domain reflectometer is obtained by deriving a transient response signal for the optical time domain reflectometer as a function of a measured output electrical signal in response to a known input optical signal, and subtracting the transient response signal from an output electrical signal obtained in response to an unknown input optical signal to derive a corrected measured output electrical signal.

3 Claims, 1 Drawing Sheet

MULTIMODE ACOUSTO-OPTIC SWITCH AND DEAD ZONE CORRECTION METHOD

This is a division of application Ser. No. 07/463,703 filed Jan. 11, 1990, now U.S. Pat. No. 5,046,832.

BACKGROUND OF THE INVENTION

The present invention relates to acousto-optic modulators, and more particularly to a multimode acousto-optic switch that is tailored to the beam characteristics of a multimode collimated light beam to allow the beam to be deflected with acceptable efficiency while providing good optical beam separation and to a method for reducing the dead zone due to the finite rise time of such a switch.

In conventional optical time domain reflectometry (OTDR) optical pulses are launched into an optical fiber to be tested, and the backscattered radiation is detected and displayed as a function of position on the fiber. Features of the detected data include locations of splices and breaks as well as the Rayleigh backscatter from microscopic inhomogeneities in the fiber. Detection of the Rayleigh backscatter is very important since it allows a single ended measurement of splice loss as well as a means of verifying that the fiber is actually attached. The need to detect the Rayleigh backscatter, which is typically 40–50 dB weaker than Fresnel reflections, requires that OTDR optics launch and receive optical power efficiently, i.e., low insertion loss, and that weak signals be readily measured in proximity to large reflections. Large signals produce a detector "tail", a relatively long time interval during which the optical detector recovers to its unilluminated signal level. During this tail interval the detector output is sufficiently large to obscure detection of the weak Rayleigh backscatter, or at least to reduce the accuracy of the light measurement.

A successful technique proposed to mask the detector from the reflective features that produce the large signals has been to use an acousto-optic modulator, i.e., a Bragg cell, for single mode optical fibers where a Gaussian approximation to the optical mode profile is appropriate. In the Bragg cell an acousto-optic medium, such as $TeO_2$, is used to deflect the incoming light beam from the fiber to one of two ports, depending upon launch and receiving conditions. This technique is described by Horiguchi et al in the *Journal of Lightwave Technology*, Vol. LT-2, No. 2, April 1984, in an article entitled "An Acoustooptical Directional Coupler for an Optical Time-Domain Reflectometer." However multimode fiber operation is more problematic since the fiber output beam is much larger making collimation and Bragg diffraction more difficult.

Also there is a dead zone during the rise time of the optical switch which has a lower limit determined by the combined speed of response of the switch and the receiver system. This lower limit may be as large as 300 nsec or 30 meters length of fiber.

Therefore what is desired is an acousto-optic modulator that is tailored to the beam characteristics of a multimode beam from a multimode fiber optic collimator that allows the beam to be deflected with acceptable efficiency while providing good optical beam separation while providing a method of correcting for the dead zone associated with the rise time of the switch and receiver system.

SUMMARY OF THE INVENTION

Accordingly the present invention provides a multimode acousto-optic switch tailored for multimode optical fiber operations with a dead zone correction factor. The acousto-optic switch is coupled to launch an optical pulse from a laser into a multimode optical fiber to be tested when the switch is off, and is coupled to deflect a multimode light beam from the multimode optical fiber to a detector when the switch is on. The acousto-optic medium of the switch is selected from a group of materials having the highest figures of merit with the lowest insertion losses at the laser wavelength, and the electrode geometry of the switch is configured to have a height to accommodate the beam diameter at the operating optical wavelength and a length consistent with the theoretical lower limit for low drive requirements. Based upon a known input signal and the output of the system, a characteristic function of the system may be derived by simple subtraction in the logarithmic scale. The characteristic function may then be subtracted from an actual measured output signal to derive an unknown input signal, minimizing the dead zone.

The objects, advantages and other novel features of the present invention are apparent from the following detailed description when read in conjunction with the appended claims and attached drawing.

DESCRIPTION OF THE PREFERRED EMBODIMENT

Figure 1:
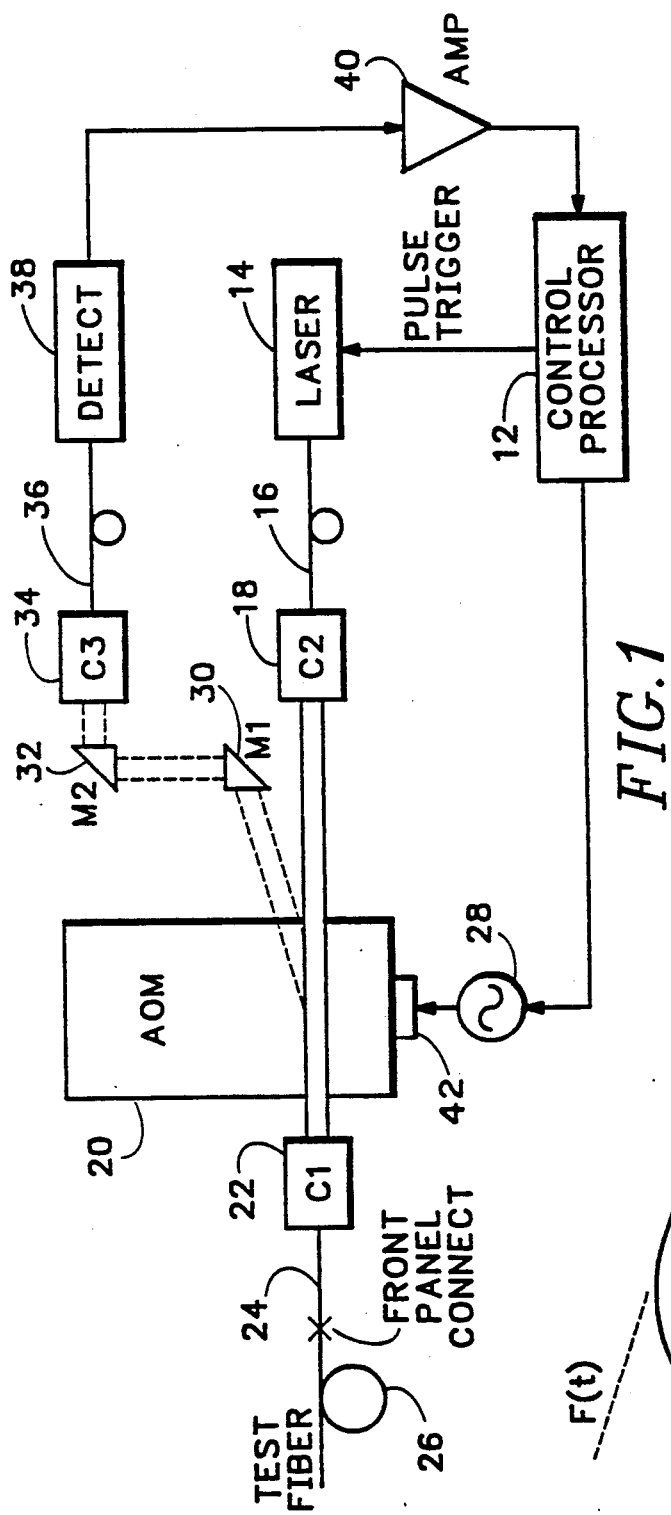
FIG. 1 is a block diagram of an optical time domain reflectometer instrument that uses a multimode acousto-optic modulator according to the present invention.

Referring now to FIG. 1 a control processor 12 triggers a pulse of light from a laser diode 14. The light pulse is guided by a fiber 16 to a collimator 18 that converts the light pulse into a beam. This collimated beam passes through an acousto-optic modulator 20, the design of which is tailored to the beam characteristics of a particular multimode beam, without disturbance when the modulator is in an OFF state. The collimated beam then passes through another collimator 22 that focuses the beam into an output fiber 24 that launches the light pulse into a fiber 26 under test. The light pulse interacts with the test fiber 26 to produce backscattered light that is returned to the output fiber 24 and converted into a collimated beam by the collimator 22. At the moment that the backscattered light passes into the modulator 20 RF power from an RF power source 28, controlled by the control processor 12, turns ON the modulator. With the modulator 20 in the ON state the return beam is deflected, using Bragg diffraction techniques, to a first mirror 30. The diffracted light beam is reflected to a second mirror 32 that steers the beam onto a third collimator 34. The beam is focused by the third collimator into a receiver fiber 36 and guided to a photodetector 38. The output of the photodetector 38 is an electrical signal that is input to an amplifier 40. The amplified electrical signal is input to the control processor 12 for further processing. The control processor 12 determines a time location for a saturating Fresnel reflection pulse from this initial data acquisition. In subsequent data acquisitions the control processor 12 generates a gate signal that turns off the RF power during the occurrence of the saturating pulse, shielding the detector from the pulse.

In order to have a modulator 20 that accommodates multimode test fibers, the material of the active medium is chosen for its large figure of merit, $M_2$, and low insertion loss. Such materials include As—Se—Ge glass having $M_2 = 250$ and $As_2S_3$ having $M_2 = 300$ as opposed to the traditional $TeO_2$ having $M_2 = 35$. These large figure of merit materials have a lower speed as a trade off for the multimode capability. Another possible material is GaAs, although the figure of merit is only 104.

For the transducer electrode 42 the important parameters are length, L, and height, H. Height is chosen to accommodate the beam diameter, such as approximately 1.2 mm. The length is chosen to be consistent with the theoretical lower limit as given by $$L> = 2*pi*W^2/w$$

where W is the acoustic wavelength and w is the optical wavelength. For As—Se—Ge glass having a propagation velocity of 2.52 um/nsec and an RF signal of 150 MHz, W is 16.8 um and L becomes 1360 um or approximately 1.4 mm. As another example for $As_2S_3$ glass having a propagation velocity of 2.6 um/nsec with the 1.2 mm beam diameter the length is 1450 um or approximately 1.5 mm.

The angular efficiency, or optical throughput, for each mode is influenced by a number of parameters. Each parameter may be changed to determine optimum configuration. This is best done by computer and is typically carried out by the manufacturer of the modulator as the manufacturer's programs are tailored to fit its processes. For As—Se—Ge glass by using acoustic power of 4.5 watts the angular efficiency for the $TEM_{00}$ mode is at least 75% and for the $TEM_{01}$ mode exceeds 40%. For $As_2S_3$ glass with acoustic power of 4 watts, the efficiencies respectively are greater than 70% and at least 40%. If the received light beam were equal parts of $TEM_{00}$ and $TEM_{01}$ modes there is an overall at least 60% efficiency. However in practice it may not be feasible to apply RF power as large as four watts due to the thermal properties of the acousto-optic materials. Therefore it may be necessary to limit the applied power to less than one watt, which may result in an upper overall efficiency limit of about 35%.

The materials of high efficiency have lower speeds of response, but the use of such a multimode acousto-optic switch still reduces the dead zone by more than one order of magnitude. However as discussed above this still leaves a lower limit fixed by the combined speed of response of the switch and receiver system. Therefore, if the switch is characterized by a transient response to a step electrical input 0 for $t \leq 0$ and r(t) for $t > 0$, then when an optical signal, f(t), is input to the switch, the output of the switch is given by $$s(t) = r(t)*f(t).$$

To obtain the transient response of the switch a known input f(t) is applied, the output s(t) is measured and r(t) is derived through a simple point by point division. In an optical time domain reflectometer the optical signals of interest are measured in decibels relative to an arbitrary level. Thus the displayed signal is $$F(t) = 10*\log[f(t)]$$

where "log" denotes the logarithm to the base 10.

Figure 2:
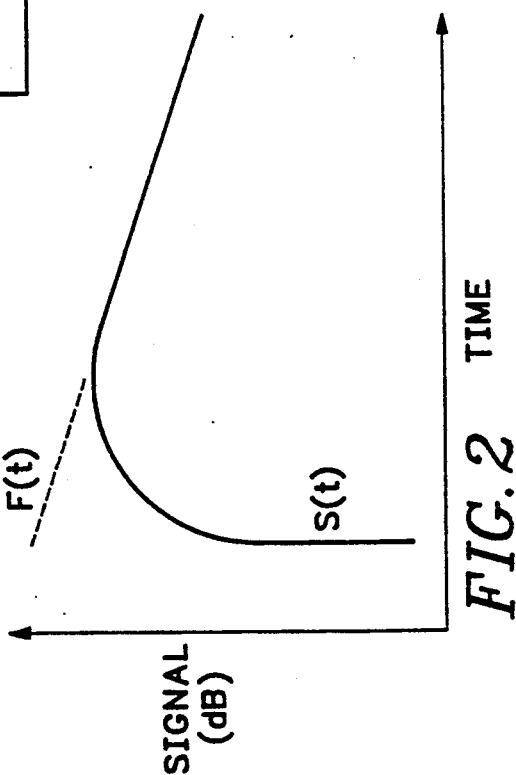
FIG. 2 is a graphic diagram illustrating the derivation of a characteristic function of a system using the multimode acousto-optic modulator of the present invention to provide dead zone correction.

If a signal is measured that has been passed through the optical switch described above, the signal becomes $$S(t) = 10*\log[f(t)*r(t)]$$

where noise is neglected for clarity in the derivation. A pictorial representation is given in FIG. 2 where the input and output signals, F(t) and S(t), are plotted as a function of amplitude in decibels versus time. In the log system taking the difference between F(t) and S(t) is equivalent to dividing f(t) by s(t), forming the difference $$D(t) = F(t) - S(t) = -10*\log[r(t)].$$

With the quantity D(t) known, it is used to correct any arbitrary measured signal, S'(t), to obtain an unknown input signal F'(t). In other words since $$S'(t) = 10*\log[f'(t)*r(t)],$$

by subtracting D(t) from S'(t) the original undistorted signal F'(t) is obtained:

$$F'(t) = S'(t) - D(t) = 10*\log[f'(t)].$$

In practice the signals S(t) and S'(t) are accompanied by noise terms such that $$D(t) \rightarrow -10*\log[r(t) + noise]$$

$$S'(t) \rightarrow 10*\log[f'(t)*r(t) + noise]$$

When these two signals are added the resulting, corrected signal contains a noise component that may be twice as large as the individual noise contributions, reducing the signal to noise ratio in the correction region by as much as −3 dB. However the correction method allows a recovery of useful signal information f'(t) that is embedded in regions of transient behavior where the transient behavior is measurable.

Although the correction method described involves a simple division of signals, a more complex method may be used where the signal s(t) is defined by a convolution of f(t) and r(t). In this case the signal D(t) is derived by a deconvolution process that requires more computational time without necessarily producing a more accurate result. Therefore where the simple division is adequate, the log system is ideal for this correction method because it automatically provides the division through a simple subtraction of signals.

Thus the present invention provides an acousto-optic modulator having an active material with a high figure of merit over 200 and having a transducer configuration adapted for multimode operation to produce an optical throughput suitable for testing multimode fibers, and provides a correction method for reducing dead zone in a system using the acousto-optic modulator by determining the transient response of the system to a known input signal and using transient response to reproduce an unknown input signal from an output signal.

What is claimed is:

1. A method of correcting for a dead zone in an optical time domain reflectometer comprising the steps of:

determining a transient response for the optical time domain reflectometer as a function of a known optical input signal and a measured output electrical signal; and applying the transient response to an actual measured output electrical signal derived from an unknown optical input signal to obtain a corrected electrical signal in the dead zone.

2. A method as recited in claim 1 wherein the determining step comprises the steps of:

applying the known optical input signal to the input of the optical time domain reflectometer;

measuring in decibels an output electrical signal from the optical time domain reflectometer obtained in response to the known optical input signal; and subtracting the output electrical signal from the known optical input signal in decibels to obtain the transient response.

3. A method as recited in claim 2 wherein the transient response applying step comprises the steps of:

measuring in decibels the actual measured output electrical signal obtained in response to the unknown optical input signal; and subtracting the transient response from the actual measured output electrical signal to obtain the corrected electrical signal.

* * * * *